April 28, 1953     C. D. WHITCOMB     2,636,267
KNIFE BLADE CUTTING EDGE
Filed May 21, 1951
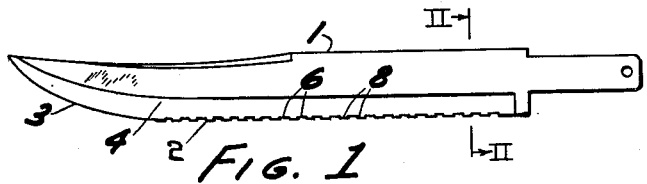
Fig. 1
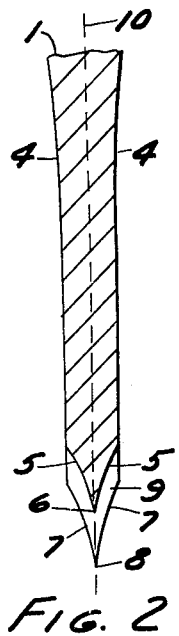
Fig. 2
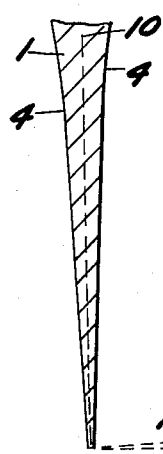
Fig. 4
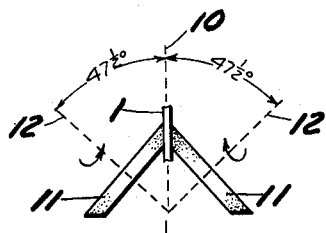
Fig. 3
Fig. 5
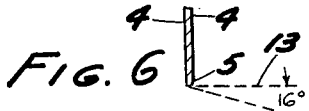
Fig. 6
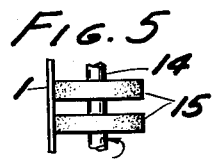
Fig. 7
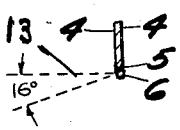
Fig. 8
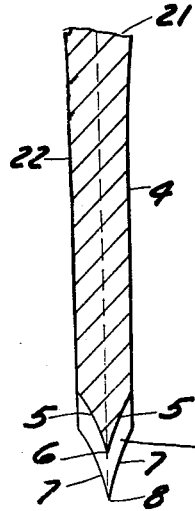
Fig. 11
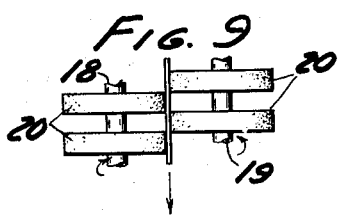
Fig. 10
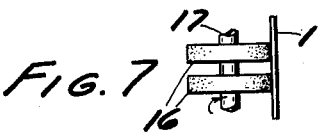
Fig. 9
Inventor
CHARLES D. WHITCOMB
By Geo E Kirk
Attorney Patented Apr. 28, 1953

2,636,267

UNITED STATES PATENT OFFICE 2,636,267

KNIFE BLADE CUTTING EDGE

Charles D. Whitcomb, Fremont, Ohio, assignor to Quikut Inc., Fremont, Ohio, a corporation of Ohio Application May 21, 1951, Serial No. 227,371

1 Claim. (Cl. 30—355)

This invention relates to the cutting edge of a knife blade and its method of manufacture. More particularly, it deals with a notched cutting portion for a knife blade forming two series of parallel alternate offset relatively short cutting edges.

The cutting edges of knife blades which are serrated produce a sawing effect when slicing or drawn, thus having a tearing action rather than a cutting action, and accordingly do not have a sharp cutting edge. Such serrated or toothed knife edges have been employed for maintaining the effectiveness of the knife edges of stainless steel blades, which do not keep a sharp straight cutting edge.

It is an object of the present invention to produce a notched cutting edge for a knife blade in a simple, effective, efficient and economic manner, which will keep its cutting edge although the knife blade may be made of stainless steel.

Another object is to produce a notched cutting edge for stainless steel knife blades which maintain a cutting edge and do not base their effectiveness upon the tearing and sawing action of the notches in the blade.

Another object is to produce a stainless steel knife blade which maintains its cutting edge much longer than would be possible on a blade having a continuous cutting edge.

Generally speaking, according to the present invention, the cutting edge of the knife blade comprises two offset parallel cutting edges, each of which edges is discontinuous alternately with each other thereby forming a plurality of relatively shallow notches along the cutting edge of the blade. It has been discovered, in order to obtain the effectiveness of the present blade, that relatively short and shallow notches must be employed, such as, for example, notches along the edge of the blade of not over about ¼ of an inch long and the two parallel cutting edges offset by the notches not offset more than 3/64 of an inch and preferably not less than about 1/64 of an inch.

Furthermore the converging faces forming the cutting edges of the knife blade are all hollow ground and preferably, also at least one face of the knife blade is further hollow ground, say for example, to a depth of at least about ¼ of an inch.

The above mentioned and other features and objects of this invention and the manner of attaining them are given more specific disclosure in the following description of embodiments of the invention taken in connection with the accompanying drawing, wherein:

Fig. 1 is a side elevation of one form of a knife blade incorporating the notched cutting edge of this invention;

Fig. 2 is an enlarged sectional view of the cutting edges of the knife blade taken along line II—II of Fig. 1 in the direction of the arrows;

Fig. 3 is a diagrammatic view of the end of a knife blade below hollow ground by a pair of grinding wheels;

Fig. 4 is an enlarged section of the knife blade after it has been hollow ground by the wheel as shown in Fig. 3;

Fig. 5 is a diagrammatic plan view of the second step in preparing the knife blade of this invention, of hollow grinding one side of the bottom of the notches in the knife blade;

Fig. 6 is a sectional view of the knife blade after it has been ground according to the step shown in Fig. 5;

Fig. 7 is a diagrammatic plan view of the third step in grinding the knife blade wherein the other side of the bottom of the notches are hollow ground, similar to Fig. 5;

Fig. 8 is a sectional view of the knife blade after it has been ground according to the step of Fig. 7;

Fig. 9 is a diagrammatic plan view of the final hollow grinding step for the outer edge or top of the notches of the knife blade according to this invention;

Fig. 10 is an enlarged sectional view of the knife blade edge after it has been ground according to Fig. 9; and Fig. 11 is an enlarged sectional view similar to Fig. 2 showing a modified knife blade, in which only one side is hollow ground according to the step shown in Fig. 3.

I.—*The knife blade*

Referring to Figs. 1 and 2 the cutting edge of knife blade 1 is shown to have a major straight region 2 and a convexed curved region 3 at its end opposite that at which a handle for the blade may be attached. From the handle of the blade along its cutting edge there is shown a major hollow ground face portion 4, which, for example, may be in the range of about ⅜ of an inch back from the edges 2 and 3 of the blade. Along the straight edge of the major hollow ground portion, for over half the length of the blade itself, that is along the slicing or cutting edge for the blade, there are provided two discontinuous parallel cutting edges one offset with respect to the other alternately providing notches which are preferably not more than, for example, about ¼ of an inch in length. The inner discontinuous cutting edge forming the bottom of the notches is provided with converging minor hollow ground faces 5, as shown in Fig. 2, terminating along the inner cutting edge 6. Along the outer edge are also provided a similar pair of minor hollow ground faces 7, parallel to the faces 5, which terminate in the outer cutting edge 8 forming the top portion of the notches. The sides of the notches thus have parallel chevron shaped faces 9 perpendicular to the cutting edges 6 and 8. The sides of these notches are preferably at right angles to the line of the edges 6 and 8, so that each of the notches have parallel sides.

The fact that the notches are equal, relatively short and shallow but being at least several times greater in length than in depth, provides two parallel aligned cutting edges both of which act as cutting edges when the knife blade is used for slicing or is thrust through an object to be cut. This knife blade is particularly advantageous for use in cutting foods, including meats, vegetables, bread, and the like.

II.—Method of manufacture

The notched knife blade according to the present invention may be produced in four successive stages as follows:

(1) The blank body 1 of the knife blade may first be hollow ground back from its cutting edge, say for example at least about ⅜ of an inch, by a pair of grinding wheels having faces at 45° angles to their axes and mounted at an angle of 47½° from the center plane 10 of the knife blade as shown for the grinding wheels 11 mounted along axis 12 in Fig. 3. Thus a hollow grind having approximately 2½° angle either side of the center of the plane 10, as shown from the perpendicular line 13 to the plane 10 in Fig. 4, is provided for at least ⅜ of an inch back from the edge 2 of the blade on each side of the blade as shown in Fig. 4, by the passing of the body of the blade 1 longitudinally between the faces of the grinding wheels 11 in Fig. 3.

(2) After the major hollow ground faces 4 are formed in the body of the blade 1, the blade may then be ground by a plurality of spaced and aligned grinding wheels 15 mounted on a common shaft 14 as shown in Fig. 5, the axis 14 of which wheels may be placed about 16° below the horizontal plane of the bottom edge of the blade 1 as shown in Fig. 6. By thus placing the edge of the one side of the hollow ground blade against the emery wheels 15, each of which is not wider than about ¼ of an inch and preferably having a space equal to the width of each of the wheels as shown, the first and one hollow ground side of the notches are ground into one side of the cutting edge of the major hollow ground surface of the blade. This grinding is continued until the notches are, for example, greater than 1/64 of an inch and not greater than about 3/64 of an inch deep from the normal edge of the blade.

(3) The next step is to grind the other side of the bottom of the notches or the other face 5 by the same set or similar set of grinding wheels 16 mounted on an axle 17 as shown in Fig. 7. It is necessary that the grinding on both sides of the blade 1 by the wheels 15 and 16 be opposite each other so that the notches will have an even sharp base or cutting edge 6 aligned with the center plane 10 of the blade and have parallel chevron shaped sides 9 perpendicular to the cutting edge 6. In this operation the inner discontinuous cutting edge 6 of the blade has now been completed with its minor hollow ground faces 5.

(4) The final stage in the production of the cutting edge of this invention is to hollow grind both surfaces of the outside part of the blade between the notches or the outer cutting edge 8 for the blade which may be done by a plurality of emery wheels 20, similar to those wheels 16 and 15 shown in Figs. 5 and 7, but which may be staggered so as not to contact each other, as shown in Fig. 9. The blade 1 may then be drawn through them longitudinally as shown by the arrow to evenly hollow grind the minor faces 7 to the outer edge of the notches and produce the second and outer discontinuous cutting edge 8 of the blade as shown in Fig. 10 (similar to that shown in Fig. 2).

Although this is one method of producing the cutting edge and blade of this invention, other methods may be used without departing from the scope of this invention in order to produce a cutting blade similar to that shown in Fig. 2. Also, if desired, it is not necessary that both sides of the cutting blade 1 have major hollow ground surfaces 4, in that one having one hollow ground surface 4 as shown in Fig. 11 is sufficient, in that the other surface 22 may be absolutely flat and straight. In the production of the blade shown in Fig. 11, the first step in the process would comprise only one emery wheel 11 as shown in Fig. 3 so that only one side 4 of the cutting blade would be hollow ground.

This countersunk or notched cutting edge 6 along a straight cutting edge 8 for the knife blade of this invention improves the efficiency of the blade many times, in that a cutting edge is always applied to the surface during the slicing operation and the parallel inner cutting edge 6 in effect reinforces and preserves the efficiency of the outer cutting edge 8.

While there is described above the principles of this invention in connection with specific apparatus, it is to be clearly understood that this description is only made by way of example and not as a limitation to the scope of this invention.

What is claimed is:

A blade having a cutting portion formed by two parallel series of alternately aligned cutting edges, the edges of one series being offset perpendicularly inwardly from the other, said cutting edges being of equal length and comparatively short, the walls between the edges being perpendicular to said cutting edges, said blade having at least one major hollow ground face portion along the cutting portion of which major face portion said two series of cutting edges are also individually hollow ground providing from each of said cutting edges diverging minor hollow ground faces terminating at least on one side of said blade in said major hollow ground face portion.

CHARLES D. WHITCOMB.

References Cited in the file of this patent

UNITED STATES PATENTS

| Number | Name | Date |
|---|---|---|
| 1,819,623 | Rocklin | Aug. 18, 1931 |
| 1,911,974 | Shelton | May 30, 1933 |
| 2,003,761 | Testi | June 4, 1935 |
| 2,059,414 | Taylor | Nov. 3, 1936 |
| 2,298,873 | Dalkowitz | Oct. 13, 1942 |